APPARATUS FOR MATING DIFFERENT WORD LENGTH MEMORIES

Filed July 29, 1965 2 Sheets-Sheet 1

INVENTOR
ROBERT F. McMAHON

BY Sughrue, Rothwell, Mion, Zinn, & Macpeak
ATTORNEYS.

| CPU INPUT ADDRESS | I/O MAR | MODE |
|---|---|---|
| 36 | 27 | 0 |
| 35 | 26 | 3 |
| 34 | 25 | 2 |
| 33,32 | 24 | 1,0 |
| 31 | 23 | 3 |
| 30 | 22 | 2 |
| 29,28 | 21 | 1,0 |
| 27 | 20 | 3 |
| 26 | 19 | 2 |
| 25,24 | 18 | 1,0 |
| 23 | 17 | 3 |
| 22 | 16 | 2 |
| 21,20 | 15 | 1,0 |
| 19 | 14 | 3 |
| 18 | 13 | 2 |
| 17,16 | 12 | 1,0 |
| 15 | 11 | 3 |
| 14 | 10 | 2 |
| 13,12 | 9 | 1,0 |
| 11 | 8 | 3 |
| 10 | 7 | 2 |
| 9,8 | 6 | 1,0 |
| 7 | 5 | 3 |
| 6 | 4 | 2 |
| 5,4 | 3 | 1,0 |
| 3 | 2 | 3 |
| 2 | 1 | 2 |
| 1,0 | 0 | 1,0 |

INVENTOR
ROBERT F. McMAHON

BY Sughrue, Rothwell, Mion, Zinn & Macpeak
ATTORNEYS.

United States Patent Office 3,380,030

Patented Apr. 23, 1968

3,380,030

APPARATUS FOR MATING DIFFERENT WORD LENGTH MEMORIES

Robert F. McMahon, Poughkeepsie, N.Y., assignor to International Business Machines Corporation, Armonk, N.Y., a corporation of New York Filed July 29, 1965, Ser. No. 475,691
4 Claims. (Cl. 340—172.5)

ABSTRACT OF THE DISCLOSURE

An apparatus for mating together two word organized memories having different word lengths to facilitate bi-directional communication between them in a manner which enables maximum data packing. If two such memories A and B have effective word lengths *a* and *b*, respectively, a data word address compatible with memory A is multiplied by $a/b$ and memory B is addressed with the whole number product of the multiplication. Predetermined bit groups of data are then transferred between memories A and B in response to the fractional remainder of the multiplication.

Figure 1:
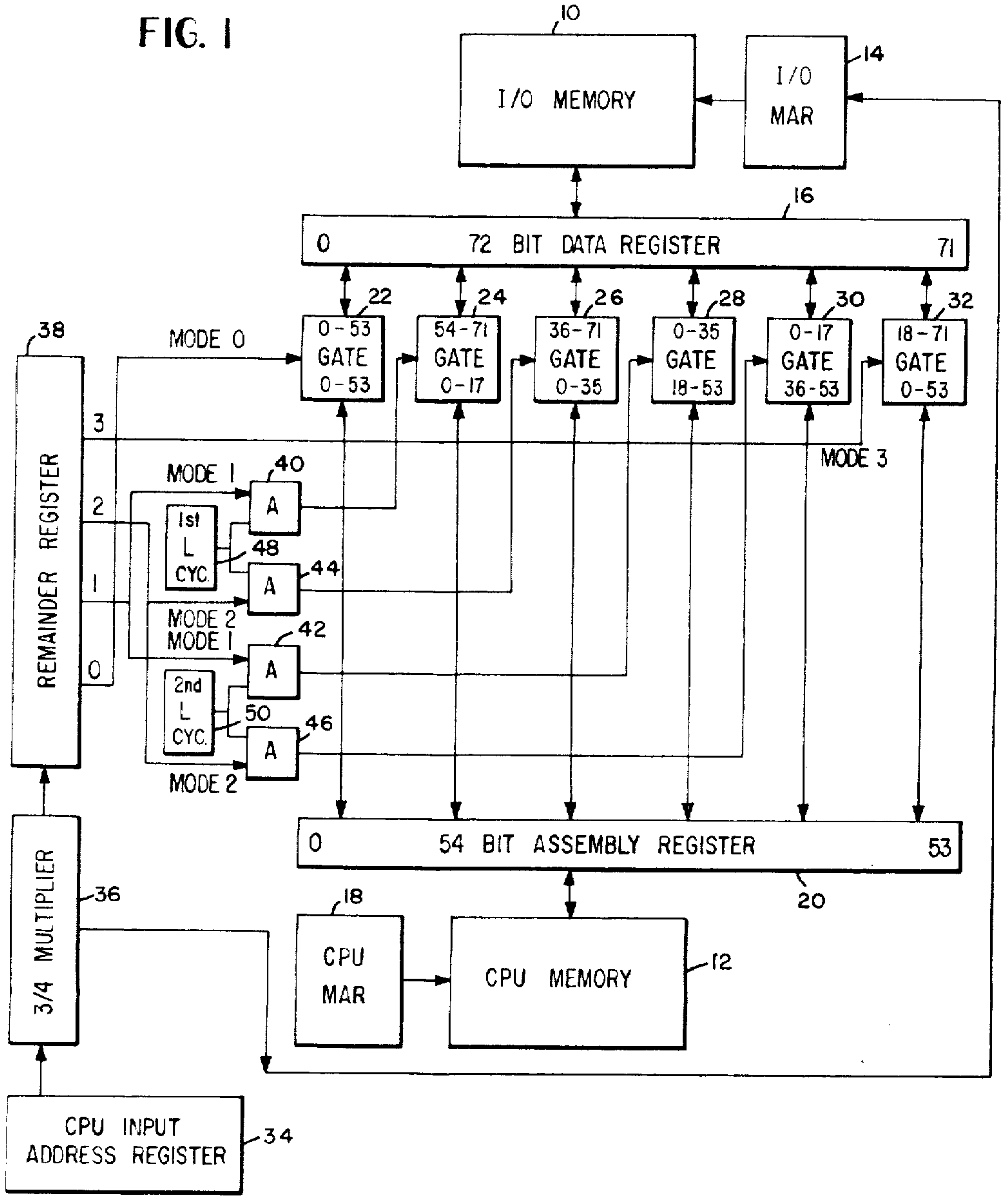

This invention relates to an apparatus for compatibly mating together two word organized memory storage devices having different word lengths to facilitate rapid bi-directional communication between them in a manner which enables maximum space utilization or data packing in the memories.

One of the more notable modern trends in the development of computers and data processing equipment has been toward flexibility. The needs for same are largely dictated by the fact that if a general purpose machine is to be economically feasible from a development and manufacturing standpoint, it must be sufficiently adaptable to meet the special requirements of many specific applications having widely different parameters. A highly desirable form of such flexibility relates to the permissive expansion of memory or storage capabilities in order to render a parent system suitable for use in an environment requiring a relatively large data storage capacity in excess of that available in the parent system. Such a memory expansion may conveniently be effected by merely mating an available auxiliary memory to that of the parent system or central processing unit, but unless both memories coincidentally have the same word length organizations, back and forth communications problems arise along with attendant address manipulation difficulties. A simple solution would be to just discard the extra bit positions in each word location of the memory having the greatest word length to reduce the latter to the shorter word length of the other memory. In most cases such an expedient is economically impractical, however, since the discarded bit positions merely lay idle or empty and represent an unacceptable waste or misuse of storage capacity. If, for example, it is desired to mate an auxiliary memory having a 72 bit word length organization to a CPU memory having a 53 bit word length organization, the discarding technique would call for the utilization of only the first 53 bit positions of each 72 bit word location in the auxiliary memory. This would amount to an abandonment of 19/72 of the auxiliary memory or approximately 26%.

It is accordingly, a primary object of this invention to provide an apparatus for mating two word organized memories having different word lengths in a manner which achieves maximum space or storage capacity utilization.

It is a further object of this invention to provide such an apparatus which permits rapid and efficient bi-directional communication between the memories while requiring a minimum amount of additional equipment.

These and further objects and advantages of this invention are implemented by first establishing a convenient ratio between the word lengths of the two memories or storage devices to be mated. Data packing or word changing in consecutive storage locations is then effected in accordance with the word length ratio when writing into the memory having the larger word length. In other words, given a 2:3 word length ratio between memories A and B, respectively, three words from memory A may be chained together to fully occupy two word locations in memory B. The first word would be completely stored in the first ⅔ of one word location in memory B, the second word would occupy the remaining ⅓ of that location and the first ⅓ of the next word location and the third word would then fit into the remaining ⅔ of said next word location. To accomplish the necessary address manipulation or conversion when performing read-write operations between the two memories, means are provided for multiplying an address compatible with the smaller word length memory by the word length ratio. The product is then employed to address the larger word length memory. Means are also provided for storing the remainder of the multiplication, which in turn controls gating means for transferring predetermined bit groups of data between the memories in a manner such that a word chained together in separate storage locations in the larger word memory is fully assembled before its transfer to the smaller word memory. The bit group handling technique is reversed when transferring from the smaller word memory to the larger word memory by essentially breaking up a word, when necessary, to chain it in separate locations in the larger word memory, again under the control of the remainder storage means.

Figure 2:
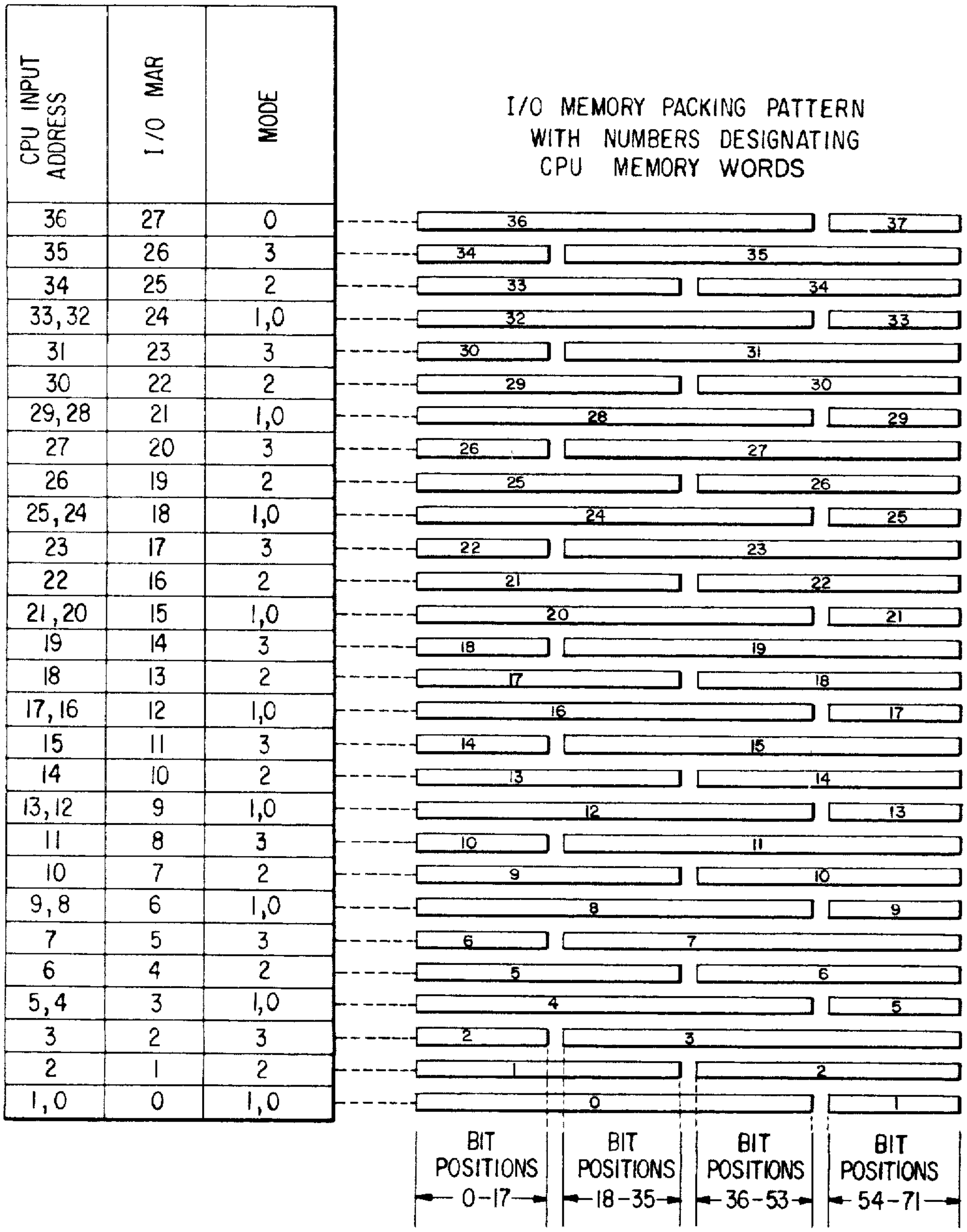

For a more complete understanding of the invention reference is now made to the following description of a preferred embodiment thereof taken in conjunction with the drawings, in which:

FIGURE 1 shows a simplified schematic block diagram of one form of apparatus which may be employed to implement the objects of this invention in a system having exemplary word length parameters, and FIGURE 2 shows the packing pattern developed in the auxiliary or I/O Memory shown in FIGURE 1 along with the original and converted memory addresses and operational modes.

Referring now to the drawings, FIGURE 1 shows an auxiliary or Input/Output Memory 10 that is to be mated to a CPU Memory 12. The I/O Memory 10 is provided with a Memory Address Register or MAR 14 and a Data or I/O Register 16, while the CPU Memory is addressed through MAR 18 and channels its input/output data through an Assembly Register 20. The I/O MAR 14 has an increment/decrement capability in the manner of a counting type register, for purposes which will be apparent below. For purposes of illustration, the I/O Memory is specified to have a word length of 72 bits while the CPU Memory accommodates 53 bit words. These parameters have been arbitrarily chosen to facilitate a development of the principles of this invention and are not to be considered as limitations thereon, for as will become apparent below, this invention is applicable to storage devices having any particular word length parameters.

A plurality of bi-directional gates 22, 24, 26, 28, 30 and 32 are connected between the registers 16 and 20 and each gate handles only predetermined bit groups from each register as indicated in the gate blocks. Gate 26, for example, communicates with bit positions 36–71, inclusive, of the Data Register 16 and with bit positions 0–35, inclusive, of the Assembly Register 20.

A CPU Input Address Register 34 is shown as the primary input source for the memory system, and this register may be considered as receiving addresses compatible with, or in the same language as, the CPU Memory 12. In simplified terms, the address setting of register 34 always corresponds to the same numbered word line in the CPU Memory 12. To effect the necessary address conversion when communicating with memory 10, the contents of register 34 are fed to a ¾ Multiplier 36. The product or result of the multiplication is employed to directly set MAR 14 while the remainder, which in this situation may be either 0, 1, 2 or 3, is supplied to a Remainder Register 38. The latter provides an output on the mode 3 line for a remainder of 1, on the mode 2 line for a remainder of 2, on the mode 1 line for the remainder of 3 and the mode 0 line for a remainder of 0. The modes 0 and 3 lines are connected to, and directly control, gates 22 and 32, respectively. The mode 1 line branches to AND gates 40 and 42 and the mode 2 line similarly branches to AND gates 44 and 46. The other inputs to these AND gates are supplied by the first and second cycle Latches 48 and 50, respectively, as more fully developed below.

The specific details of the various structural components shown in FIGURE 1 have not been set forth herein in the interest of simplicity since they are all conventional and well known in the electronic arts. Furthermore, the complete data processing system with which the apparatus of FIGURE 1 is adapted to be used has not been disclosed since it forms no part of the present invention.

Before proceeding to an operational description of the invention the techniques employed to adjust the effective word lengths of the memories will be briefly outlined. In the example presented above, it was stated that the I/O Memory and CPU Memory have word lengths of 72 bits and 53 bits, respectively. To reduce the structural requirements of the memory mating problem, it is first desirable to adjust the effective word lengths to establish a relatively simple ratio between them. The ratio of 53:72 is incapable of simplification or reduction, but it is readily recognized that a ratio of 54:72 reduces to 3:4 and an acceptably simple ratio may, therefore, be arrived at in this instance by merely increasing the effective length of each CPU Memory word by 1 bit. This is conveniently accomplished by providing an extra bit position in the Assembly Register 20, as indicated by its 54 bit capacity in FIGURE 1. The practical import of such a ratio adjustment is that four words from the CPU Memory may now be chained together to fully occupy three complete word locations in the I/O Memory as shown in the packing pattern diagram of FIGURE 2. While it is true that without the adjustment 72 CPU words could be consecutively chained into 53 I/O Memory word locations, the circuitry required to effect such a transfer and convert the addresses would be prohibitive from a cost standpoint.

The acceptability level for the adjusted word length ratio is thus a function of conflicting factors and will vary with each situation, since each bit added to a word to reduce the ratio represents a circuitry economy at the expense of unused or idle storage capacity. If the original ratio was 17:36, for example, an adjustment to 18:36 or ½ at the sacrifice of $\frac{1}{18}$ of the larger word length memory capacity would probably be acceptable owing to the hardware savings. On the other hand, if the original ratio, was 2:9, the cost and complexity factors involved would dictate whether an adjustment to 3:9 or 1:3 would be acceptable, since this would represent a sacrifice of ⅓ of the auxiliary storage capacity.

Considering now the operation of the apparatus shown in FIGURE 1, same may best be described by presenting several illustrative examples.

*Example I*

Suppose that it is desired to transfer the word that would normally occupy word line or location "28" in Memory 12, but which has been written into Memory 10, back into Memory 12. The CPU compatible address "28" appearing in Input Register 24 is fed to the multiplier 36. The product of the multiplication by ¾ or 21, is then supplied to MAR 14 as the converted address for Memory 10. The conversion may be verified by referring to FIGURE 2, where it is seen that the CPU word "28" does in fact occupy part of line "21" in Memory 10. The entire contents of line "21" in Memory 10 are now read out, either destructively or non-destructively as the case may be, to the 72 bit Data Register 16 to await transfer. At the same time the remainder of the multiplication, in this case "0," is stored in register 38 and raises the mode 0 output line to gate 22. The actuation of the latter now transfers the contents of bit positions 0–53 in register 16, which corresponds to the complete CPU word "28" as seen in FIGURE 2, into the Assembly Register 20 to completely fill it. CPU word "28" has now been recovered from the I/O Memory 10 and may be transferred into the CPU Memory 12 during the next clock cycle.

*Example II*

Assuming that it is desired to transfer word "27" from the CPU Memory to the I/O Memory, this 53 bit word is first placed in the Assembly Register 20. At the same time the address "27" from register 34 is fed to multiplier 36. The whole number product of the multiplication is 20 and this is supplied to MAR 14 to Address Memory 10. The remainder of ¼ now raises the mode 3 output line from the Remainder Register 38, which in turn actuates gate 32 to transfer the entire contents of Assembly Register 20 into bit positions 18–71 of Data Register 16. When the latter is subsequently read into line "20" of the I/O Memory, word "27" fills the last ¾ of the line, which is the proper location as indicated in FIGURE 2.

*Example III*

Considering the transfer of word "26" from the I/O Memory to the CPU Memory, the converted address yields a whole number product of 19 and a remainder of ½. The I/O MAR 14 is then set at 19 and this entire word line is read out to the Data Register 16, including portions of words "25" and "26" as seen in FIGURE 2. The remainder of ½ raises the mode 2 output line from the Remainder Register 38 which conditions AND gates 44 and 46. Since word "26" has been broken up into two portions and chained together in lines 19 and 20 in the I/O Memory, two machine cycles will be required to recover the separate portions of the word and re-assemble them. During the first cycle Latch 48 turns on to complete the output conditions for AND gate 44, which now activates gate 26 to transfer bits 36–71 from the Data Register to bit positions 0–35 of the Assembly Register. Referring to FIGURE 2, it will be observed that this operation has effected the recovery of the first ⅔ of word "26" which was stored on line "19" in the I/O Memory 10.

At this time the I/O MAR 14 is incremented by 1 to address line "20" in the memory 10 by means, not shown, responsive to the mode 2 output. Line "20," which contains the remaining ⅓ of word "26" and all of word "27," is now read out to the Data Register 16. The second cycle Latch 50 now turns on to actuate gate 30 through AND gate 46 and transfer bits 0–17 from the Data Register to bit positions 36–53 of the Assembly Register. This completes the recovery of word "26" which now appears completely assembled in the register 20, and it may be transferred to the CPU Memory 12 during the next clock cycle.

*Example IV*

If word "25" is to be read out of the CPU Memory and written into the I/O Memory, the entire word is placed in the Assembly Reigster 20. The multiplication of word "25" results in a whole number product of 18 and a remainder of ¾. The I/O MAR 14 is therefore set to address word line "18" and the mode 1 output line of the Remainder Register 38 is raised. The mode 1 output conditions AND gates 40 and 42, and when the first cycle Latch 48 is turned on AND gates 40 actuates gate 24 to transfer bits 0–17 from the Assembly Register to bit positions 54–71 in the Data Register. During the next clock cycle the contents of the Data Register are read into line "18" of the I/O Memory to complete the transfer of the first ⅓ of word "25" into the last ¼ of word line "18," which is in proper accordance with the packing pattern as seen in FIGURE 2.

The I/O MAR 14 is now incremented by 1 to address line "19" in the memory. When the second cycle Latch 50 turns on AND gate 42 actuates gate 28 to transfer bits 18–53 from the Assembly Register to bit positions 0–35 in the Data Register. The contents of the latter are then read into line "19" in the I/O memory with the remaining ⅔ of word "25" thus occupying the first ½ of the word line. This completes the breakdown of word "25" and its chaining or packing into consecutive storage locations in the I/O Memory.

As may be seen from the foregoing description, this invention is effective to transfer complete data words between memories having different word lengths in a manner which results in a maximum data packing or storage capacity utilization while requiring a minimum amount of additional hardware. It will be readily appreciated that the principles of this invention are applicable to any memory mating situation with any particular word length parameters. If, for example, the effective word length ratio was 5:6, ten bi-directional gates would be required and six multiplication remainders would be possible, thereby necessitating the handling of six operational modes. The memories themselves may be of any conventional type, such as magnetic core, tape, drum, etc. Furthermore, this invention is equally applicable when the word length ratio with respect to the memory with which the input address is compatible is greater than unity, such at 4:3. This condition would obtain in the example described above if the CPU and I/O Memory word lengths were reversed to 72 and 53, respectively. In such a case the multiplication factor would simply be inverted to 4/3, five bit group gates instead of six would be required and the number of operational modes would decrease to three.

It is also to be understood that all non-critical elements of structure have been omitted from the description of the invention for the sake of simplicity and clarity. In a complete system the usual timing or clocking control means would be provided to effect the operations described above in the proper sequence, as well as means for causing the bit group gates to transfer data in the desired direction. The I/O MAR incrementing function could easily be implemented by an AND gate responsive to either the mode 1 or mode 2 outputs and the second cycle Latch.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for transferring data words between two memories A and B having effective word lengths *a* and *b*, respectively, comprising:

(a) means for multiplying a data word address compatible with memory A by *a*/*b*, (b) means for addressing memory B in response to the product of the multiplication, and (c) means for transferring predetermined bit groups of data between memories A and B in response to the remainder of the multiplication.

2. An apparatus as defined in claim 1, wherein the means recited in subparagraph (c) includes:

(a) individual input/output registers associated with each memory, and (b) a plurality of bi-directional gating means each connected between different predetermined bit groups of each register.

3. An apparatus as defined in claim 2, further including:

(a) a register for storing the remainder of the multiplication, and (b) logic gate means responsive to selected outputs from the register for controlling selected ones of the bi-directional gating means.

4. An apparatus for transferring data words between two memories A and B having effective word lengths *a* and *b*, respectively, in a manner which implements maximum data packing, comprising:

(a) means for multiplying a data word address compatible with memory A by *a*/*b*, (b) a first register for addressing memory B in response to the whole number product of the multiplication, (c) a second register for storing the fractional remainder of the multiplication and having a plurality of outputs (d) individual input/output registers associated with each memory, (e) a plurality of bi-directional gating means each connected between different predetermined bit groups of each input/output register, (f) means for directly controlling two of the gating means in response to two of the second register outputs, (g) a plurality of cycle latches, and (h) AND gate means responsive to the cycle latches and the remaining second register outputs for controlling the remaining gating means, whereby predetermined bit groups of data are transferred between memories A and B and chained together in consecutive storage locations, when necessary, to effect maximum data packing.

References Cited

UNITED STATES PATENTS

| | | | |
|---|---|---|---|
| 3,270,324 | 8/1966 | Meade et al. | 340—172.5 |
| 3,299,410 | 1/1967 | Evans | 340—172.5 |
| 3,310,786 | 3/1967 | Rinaldi et al. | 340—172.5 |
| 3,317,899 | 5/1967 | Chien et al. | 340—172.5 |

PAUL J. HENON, *Primary Examiner.*